United States Patent [19]

Staiger

[11] Patent Number: 5,379,082
[45] Date of Patent: Jan. 3, 1995

[54] METHOD OF AUTOMATICALLY FOCUSING GLASS-MOUNTED AND GLASSLESS SLIDES IN SLIDE PROJECTORS

[75] Inventor: Ulrich Staiger, Stuttgart, Germany

[73] Assignee: Eastman Kodak Company, Rochester, N.Y.

[21] Appl. No.: 119,095

[22] PCT Filed: Jan. 15, 1993

[86] PCT No.: PCT/EP93/00084

§ 371 Date: Sep. 14, 1993

§ 102(e) Date: Sep. 14, 1993

[87] PCT Pub. No.: WO93/14440

PCT Pub. Date: Jul. 22, 1993

[30] Foreign Application Priority Data

Jan. 18, 1992 [DE] Germany .................. 4201272

[51] Int. Cl.[6] .......................................... G03B 21/53
[52] U.S. Cl. .................................................. 353/101
[58] Field of Search .............. 353/101, 100, 95, 96, 353/121, 69

[56] References Cited

U.S. PATENT DOCUMENTS

| 3,249,007 | 5/1966 | Stauffere | 353/101 |
| 3,517,992 | 6/1970 | Holle | 353/101 |
| 3,639,047 | 2/1972 | Holle | 353/101 |
| 4,494,839 | 1/1985 | Brueckner | 353/101 |

FOREIGN PATENT DOCUMENTS 1536100 9/1967 France .

OTHER PUBLICATIONS

Patent Abstracts of Japan, vol. 011 No. 156 (p. 578) 21 May 1987 & JP,A, 61 290 414 (Hitachi Ltd.) 20 Dec. 1986.

Primary Examiner—William A. Cuchlinski, Jr.
Assistant Examiner—William C. Dowling
Attorney, Agent, or Firm—Raymond L. Owens

[57] ABSTRACT

A method of automatically focusing glass-mounted and glassless slides, permitting quick and reliable focusing as a function of the thickness of the glass mount. According to the invention, the multiple IR radiation images of a mask aperture reflected from glass-mounted slides are focused onto a CCD line sensor. Number and spacings of the images are subsequently electronically detected with respect to their sequence on the CCD line sensor, the second image detected being projected onto a predetermined cell of the line sensor by shifting an autofocusing device and projection lens carrier by means of an electromechanical adjusting apparatus, the cell corresponding to a focused projection image of a glassless slide. Simultaneously, a signal is electronically produced corresponding to the spacing between a first and a second aperture image and cause the projection lens to be shifted by the adjusting apparatus within the autofocusing device carrier by the spacing determined.

2 Claims, 1 Drawing Sheet

METHOD OF AUTOMATICALLY FOCUSING GLASS-MOUNTED AND GLASSLESS SLIDES IN SLIDE PROJECTORS

FIELD OF THE INVENTION

The invention relates to a method of automatically focusing glass-mounted and glassless slides in slide projectors in which a mask aperture arranged sideways to the optical axis of a projection system is illuminated by means of an IR light source, imaged on the slide via an optical system and reflected, the reflected image being projected in a considerably reduced size onto a receptor via a second optical system positioned on the other side of the optical axis and said projected image providing a signal for controlling a focusing device.

BACKGROUND OF THE INVENTION

In most known methods of this type for image focusing the receivers consist of twin type photosensors, which when the image is correctly focused receive equal amounts of IR radiation. When the slide is shifted out of the focal plane to one or the other direction, the image of a mask aperture imaged on and reflected from the slide onto the two cells of the IR receiver moves across the sensor windows in one or the other direction. As a result, one of the two receivers is supplied with more IR radiation than is the other, causing an adjusting mechanism to readjust the distance between slide and lens by using the IR transmitter and receiver typically coupled to that mechanism. This method causes hardly any problems when slides of one type of mount are used, as for example glassless or glass-mounted slides using glass of identical thickness.

In the case of glass-mounted slides however, there is a problem in that when the IR light beam hits bright areas of the slide—three images are projected onto the receiver. The first image corresponds to the back reflection off the glass surface of the slide, the second image to the reflection off the film base. There are actually four images located close to one another, i.e. a first one of the rear surface of the front glass, a second one of the base material of the film, a third one of the emulsion side of the film and a fourth one of the front surface of the rear glass, all of which are imaged on the twin type receiver. If the second image is projected onto the receiver such that each of the two receivers is supplied with an identical amount of IR radiation, the slide is not yet focused. Due to the glass located in front of the slide the object plane is shifted forwards by the amount:

$$X = d \times \frac{n-1}{n}$$

d = thickness of glass n = IR refraction index of the glass whereas the autofocus system coupled to the lens was adjusted by the amount:

$$X = d \times \left(1 - \sqrt{\frac{1 - \sin^2 a}{n^2 - \sin^2 a}}\right)$$

with a representing the angle between the impinging or reflected central beam of the autofocus system and the optical axis of the imaging system.

To eliminate this disadvantage, the following solutions have been disclosed, for example:

To consider the different focal planes for glass-mounted and glassless slides, in DE-OS 1 797 061 a misalignment of the autofocusing device is introduced by using an additional photosensor when glass-mounted slides are projected in which the photosensor is illuminated via a semitransparent auxiliary mirror located in front of one of the halves of the twin type photosensor. The auxiliary mirror is arranged such that the back reflection off the film layer of a glassless slide does not hit the semitransparent mirror so that no shifting of the focal plane is caused in this case, which would otherwise be effected when the auxiliary photosensor were illuminated.

From FR-PS 1 536 100, it is known that after each slide change the slide gate is moved from an extreme position to a focused position by means of an advancing device, the reflections generated by a glass-mounted slide being counted by means of a logic when they impinge on an electrooptical transducer and the advancing device being shut off when the second reflection decisive for focusing hits the transducer. It is, however, a disadvantage that each slide is initially projected when out of focus as the number of reflections has to be determined from the extreme position.

SUMMARY OF THE INVENTION

It is the object of the invention to provide a method of automatically focusing glass-mounted and glassless slides in slide projectors which method permits quick and reliable focusing as a function of the thickness of the glass mount.

According to the invention, this is attained in the multiple IR radiation images of the mask aperture reflected from glass-mounted slides are focused onto a CCD line sensor. Subsequently, the number and spacings of the images are detected with respect to their sequence on the CCD line sensor by electronic means. The second aperture image determined is projected onto a predetermined cell of the line sensor by shifting an autofocusing device and projection lens carrier by means of electromechanic adjusting means, said cell corresponding to a focused projection image of a glassless slide. By electronic means, a signal is simultaneously produced which corresponds to the spacing between a first and a second aperture image causing an adjusting means to shift the projection lens within the autofocusing device carrier by the spacing determined.

In a simple way, it is thus advantageously attained that the displacement of the object plate due to the glass in front of the slide is compensated exactly by the amount of the thickness of the glass and, as a result, the slide is imaged in focus. With the given arrangement of the autofocus system, i.e. of the light incidence angle, the focal distance of the imaging system and a constant refractive index, the distance between the first and the second image on the CCD line sensor is a function of the thickness of the glass arranged in front of the slide. As in the case of glass-mounted slides the number of the aperture images imaged on the CCD line sensor is determined such that always the first image determined corresponds to the reflection off the surface of the glass mount, the reflection corresponding to the reflected image off the film surface is thus—irrespective of its light intensity—also determined.

DESCRIPTION OF PREFERRED EMBODIMENTS

Figure 1:
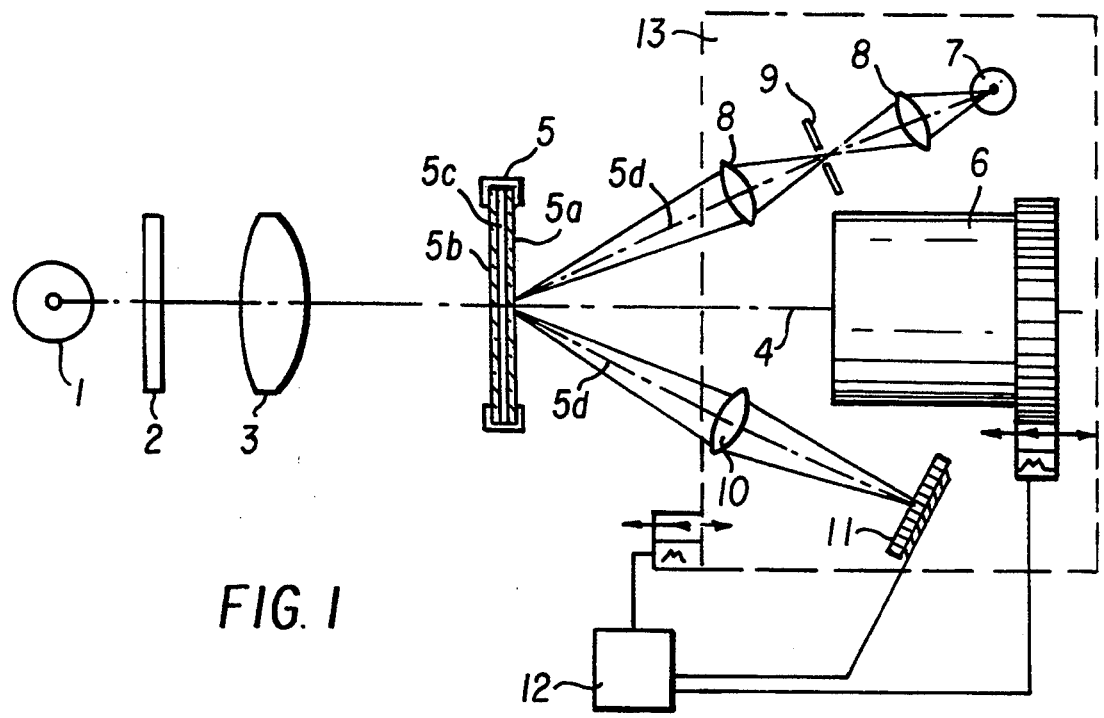
FIG. 1 is a schematic diagram of a projector according to the present invention.
Figure 2:
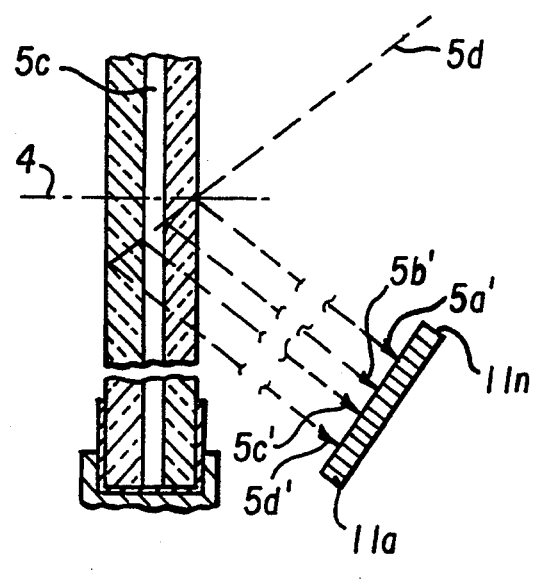
FIG. 2 is a schematic view showing the reflection of a mask aperture image from a glass slide.

A preferred embodiment of the invention will now be described in detail. Referring to FIGS. 1 and 2, a light beam, having an optical axis 4 emitted by the lamp 1, of a known slide projector is directed via a condenser 3, a heat-absorbing filter 2 and through a slide 5 to a lens 6 which images the slide 5 on a projection screen. Then lens 6 is mounted on a support 13 so as to be axially shiftable thereon as shown by arrows 18, and the support 13 also carries an adjustable autofocus system 15. The autofocus system 15 comprises an IR light source arranged sideways to the optical axis and projecting a mask aperture 9 onto the slide 5 via an optical system 16, and a CCD line sensor 11 featuring a plurality of cells 11a–11n and receiving the reflected aperture image via a second optical system 17 arranged on the other side of the optical axis 4 of the lens 6. By means of stepper motors M, the lens 6 and the autofocus system 15 can be adjusted interdependently or independently.

Assuming the projection of a glassless focused slide, (not shown) one of the cells 11a–11n of the CCD line sensor 11 will receive a maximum of the IR radiation emitted by the autofocus system 15. The location of the cell and the positions of the autofocus system 15 and the lens 6 are stored in an electronic circuit 12 as values defining correct focus of the projected image. In the case of a glass-mounted slide 5 subsequently inserted into the slide gate of the projector, a number of aperture images 5a'–5d' are produced on the CCD line sensor 11 according to the multiple reflections of the IR radiation caused by the various glass and film surfaces 5a, 5b, 5c of the slide 5. By scanning the conditions of the individual CCD sensor cells 11a–11n for energy maximums, it is determined via the electronic circuit 12 whether one, two or three aperture images are imaged on the line sensor 11. As the cells 11a–11n of the CCD line sensor 11 are scanned such that the reflection off the first surface of the glass 5a corresponds to the first aperture image 5a', the second image 5b' necessarily represents the film plane decisive for focusing. By means of a stepper motor M, the lens 6 together with the autofocus system 15 is shifted such that the second aperture image 5b' or its energy maximum determined by the electronic circuit 12 is projected onto that cell 11a–11n of the CCD line sensor 11 which was stored as being "focused" and which corresponds to the sensor cell of a glassless slide. Due to the given arrangement of the autofocus system 15, such as the constant refractive index of the glass, the focal distance of the imaging system, etc., the thickness of the glass arranged in front of the slide 5 is a clear function of the distance between the first 5a' and the second 5b' aperture images. The electronic circuit 12 determines the spacing S1 between the first 5a' and the second 5b' aperture image projected onto the CCD line sensor 11 and produces an electric signal proportional thereto, said signal shifting the projection lens 6 within the autofocusing device carrier 13 by means of the stepper motor M by the spacing S1 determined. Thus, the glass-mounted slide 5 is now in focus. De-focused projection images due to different glass thickness of the slide glass mounts are thus eliminated.

If now a glassless slide is inserted in the projector, the cells of the CCD line sensor 11 are again scanned so that the number of aperture images can be determined. If only one aperture image is detected, the autofocus system 15 and the lens 6 are shifted until the cell of the CCD line sensor 11 defining the correct focus condition will received a maximum of energy when the aperture image is imaged on this cell.

I claim:

1. A method of automatically focusing glass-mounted and glassless slides in slide projectors in which a mask aperture arranged sideways to the optical axis of a projection system is illuminated by an IR light source, imaged onto a glass-mounted or glassless slide via a first optical system and reflected from said glassless or glass-mounted slide so as to be projected in a considerably reduced size onto a receptor via a second optical system positioned on the other side of said optical axis, wherein a projected image provides a signal for controlling a focusing device for focusing said glassless or glass-mounted slide relative to said projection system, and in which multiple reflected aperture images are projected for a glass-mounted slide, the method comprising the steps of:
   i) focusing said multiple aperture images reflected from said glass-mounted slide onto a CDD line sensor;
   ii) detecting the number and spacing of said multiple images with respect to their sequence on said CDD line sensor via electronic means;
   iii) projecting the second of said multiple reflected aperture images onto a predetermined cell of said CDD line sensor by shifting an autofocusing device and projection lens carrier of said projection system via electromechanical adjusting means; and
   iv) simultaneously with iii) producing a signal corresponding to the spacing between the first and second of said reflected apertures causing said autofocusing device to adjust said projection lens carrier by said spacing.

2. The method as recited in claim 1, wherein the first reflected aperture image impinging on said CDD line sensor corresponds to the reflection produced on the glass surface of the slide mount, in the case of a glass-mounted slide.

* * * * *